(12) United States Patent
Tjader (10) Patent No.: US 7,384,214 B2
(45) Date of Patent: Jun. 10, 2008

(54) PIPE SPLITTER AND METHOD

(75) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 0 days.

(21) Appl. No.: 11/463,530

(22) Filed: Aug. 9, 2006

(65) Prior Publication Data

US 2007/0048091 A1    Mar. 1, 2007

Related U.S. Application Data

(60) Provisional application No. 60/706,695, filed on Aug. 9, 2005.

(51) Int. Cl.
*F16L 1/028* (2006.01)
(52) U.S. Cl. .................................. 405/184.3
(58) Field of Classification Search .............. 405/184.3
See application file for complete search history.

(56) References Cited

U.S. PATENT DOCUMENTS

| | | | | |
|---|---|---|---|---|
| 2,432,278 A | * | 12/1947 | Bratz | 285/261 |
| 4,572,565 A | * | 2/1986 | Epstein | 294/102.1 |
| 5,192,165 A | * | 3/1993 | Torielli | 405/184.3 |
| 6,340,270 B2 | * | 1/2002 | Puttmann | 405/184.3 |
| 6,585,453 B2 | * | 7/2003 | Robinson | 405/184.3 |
| 6,761,507 B2 | * | 7/2004 | Wentworth et al. | 405/184.3 |
| 2006/0099035 A1 | * | 5/2006 | Wentworth | 405/184.3 |

* cited by examiner

*Primary Examiner*—John Kreck
(74) *Attorney, Agent, or Firm*—Schwegman, Lundberg & Woessner, P.A.

(57) ABSTRACT

A pipe splitting assembly includes a pipe splitter, for instance, a cutter with one or more blades. An expander is flexibly coupled with the pipe splitter and allows the pipe splitter to rotate out of alignment with the longitudinal axis of the expander. In one example, the pipe splitter includes a cylindrical base portion and a frusto-conical base portion proximal to the cyclindrical base portion, and an exterior surface of the frusto-conical base portion is flush with an exterior surface of the expander. In another example, the expander has a larger outer perimeter than the cutter. Optionally, the pipe splitting assembly further includes a puller shoulder sized and shaped to couple with the expander, and a puller sleeve adapted to receive and hold a replacement pipe.

34 Claims, 10 Drawing Sheets

PIPE SPLITTER AND METHOD

RELATED APPLICATION

This application claims the benefit of U.S. Provisional Application Ser. No. 60/706,695 filed on Aug. 9, 2005, which application is incorporated herein by reference.

TECHNICAL FIELD

Pipe splitting and in particular assemblies for splitting pipes and positioning replacement pipes.

BACKGROUND

Pipe, such as plastic, copper, lead pipe and the like, has been used for connecting homes and creating networks for utilities, for instance, water, sewage and natural gas. As pipes become older, they break down, crack, develop scaling on interior surfaces that can clog the pipe, etc. and thereby require replacement.

A technique know as pipe bursting is currently used as a convenient method to replace underground pipe without the need to completely dig up the pipe to be replaced. A pipe breaking device, such as an expander or a mole, is pulled by a cable through the existing pipe while it is still underground. The expander is designed to break, split or burst the pipe, and at the same time to push the old pipe into the surrounding soil. The expansion of the old pipe allows the expander to pull a replacement pipe into place.

Pipe splitters typically use one or more cutting surfaces to split pipe material. Typically, the cutting surfaces engage against the end of the pipe and are pulled longitudinally to split the pipe. Large pulling forces are required to pull cutting surfaces with this configuration through the pipe material and thereby split the pipe. In some examples, where the existing pipe is located in soft soil, the pulling force transmitted from the cutting surfaces to the pipe will move the pipe through the soil instead of splitting the pipe material.

In other examples, pipe splitters are used to burst small diameter pipes and thereby must navigate tight bends in the pipe. An elongate pipe splitter experiences stress as it attempts to navigate tight bends and sometimes fractures within the pipe. This requires extraction and replacement of the pipe splitter to continue the operation. Replacement of the pipe splitter increases labor. Additionally, the pipe splitter is constructed with hardened steel in some examples, and is expensive. Replacing the pipe splitter thereby increases the cost of splitting small diameter pipes.

What is needed is a pipe splitter that provides consistent cutting without requiring excessive pulling forces. What is further needed is a pipe splitter capable of navigating bends in small diameter pipes without fracturing.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
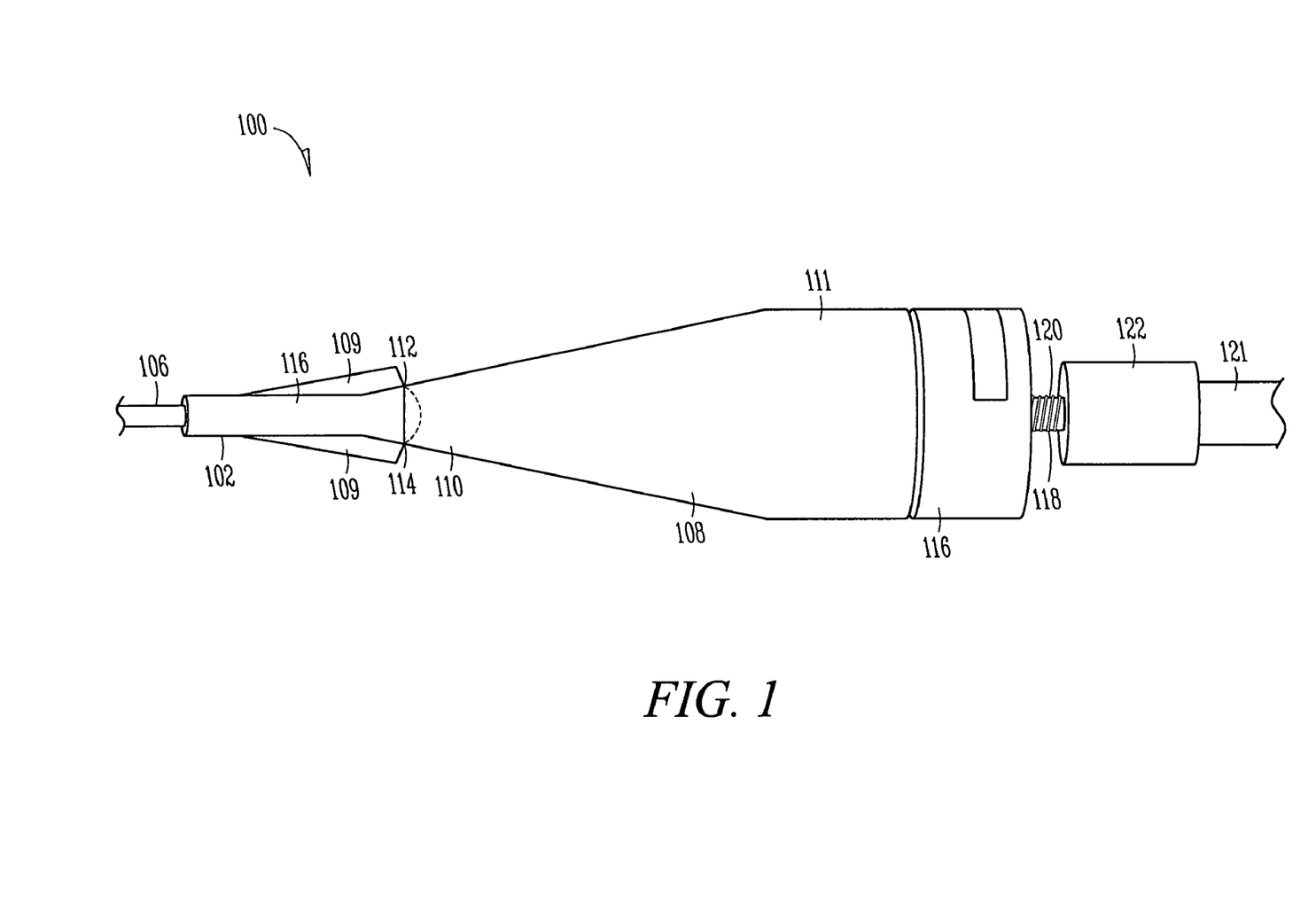
FIG. 1 is a side view of one example of a pipe splitting assembly.

One example of a pipe splitting assembly 100 is shown in FIG. 1. The pipe splitting assembly 100 includes a pipe splitter, such as a cutter 102. As shown in FIG. 1, in one example, the cutter 102 includes dual blades 104. The blades 104 are sized and shaped to engage with a pipe and split the pipe. The cutter 102 includes a lumen extending therethrough sized and shaped to receive a flexible element, such as a cable 106. In yet another example, the flexible element includes, but is not limited to a rope, rod, wire, band and the like.

An expander 108 is coupled with the cutter 102. The expander 108, in one example, has a lumen sized and shaped to receive the cable 106. The cutter 102 and expander 108 lumens cooperate with the cable 106 to ensure the expander 108 and the cutter 102 maintain their arrangement along the cable 106. The expander 108 has an outer perimeter larger than an outer perimeter of the cutter 102. In another example, the expander 108 has a substantially frusto-conical geometry with a tapering profile that gradually increases in diameter from a distal end 110 of the expander 108 toward a proximal end 111. The large outer perimeter of the expander 108 pries and bursts the split pipe apart to make room for a replacement pipe, as described below.

In one example, a distal end 110 of expander 108 is coupled with a proximal end 112 of the cutter 102. As further described below, the cutter 102 and the expander 108 are flexibly coupled, for instance, with a flexible joint 114. The flexible joint 114 permits rotation of the cutter 102 with respect to the expander 108. Individually, the cutter 102 and the expander 108 have sufficiently short lengths to permit navigation through tight corners and elbows of pipes. The flexible joint 114 allows the cutter 102 and the expander 108 to cooperate in the pipe splitting assembly 100 and traverse tight corners and elbows together. For example, the cutter 102 is able to angle around tight corners and elbows in a pipe without becoming trapped. The expander 108, coupled to the cutter 102 at the flexible joint 114, follows the cutter 102 and angles through the tight corner or elbow.

Referring again to FIG. 1, the pipe splitting assembly 100 includes a puller shoulder 116 coupled with the expander 108. In one example, the puller shoulder 116 has an outer perimeter similar to the outer perimeter of the expander 108. In another example, the puller shoulder 116 has an outer perimeter smaller than the outer perimeter of the expander 108. A bridge 118 extends from the puller shoulder 116 proximally. The bridge 118 and the puller shoulder 116 are integral, in yet another example. Optionally, the bridge 118 and the puller shoulder 116 are separate pieces and coupled together (e.g., with corresponding threading, bolts, welds, mechanical fittings and the like). As shown in FIG. 1, the bridge, in still another example, includes threading 120. A puller sleeve 122 is coupled around the bridge 118. The puller sleeve 122 and the bridge 118 cooperate to clamp a replacement pipe (e.g., replacement pipe 121) between the bridge 118 and the interior surface of the sleeve 122. Optionally, the threading 120 of the bridge 118 is a tap sized and shaped to cut corresponding threading into the interior of the replacement pipe 121. The puller shoulder 116, the bridge 118 and the puller sleeve 122 cooperate to clamp the replacement pipe 121 thereto and couple the replacement pipe 121 to the expander 108. The puller shoulder 116 facilitates pulling of the replacement pipe 121 into the cavity formed by the cutter 102 and the expander 108.

Figure 2:
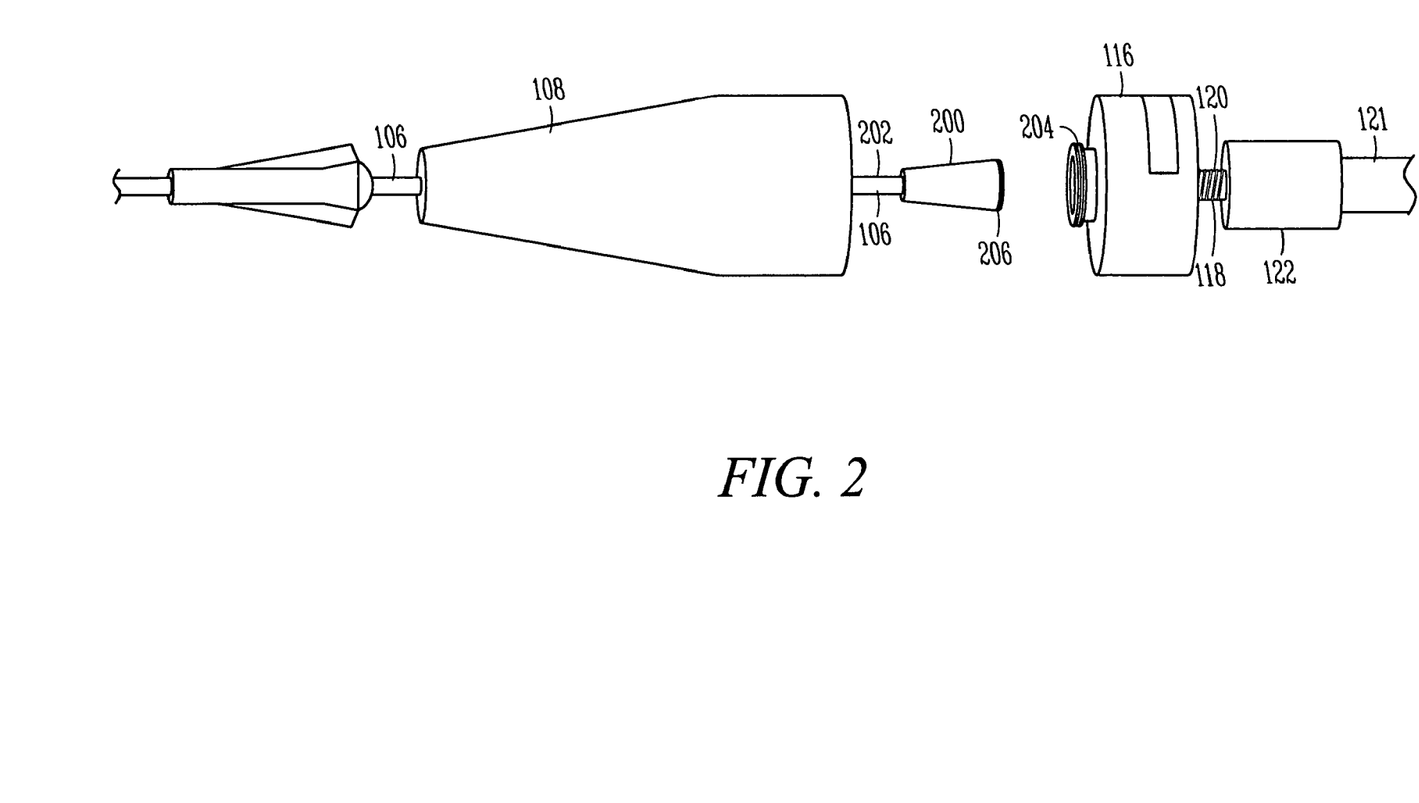
FIG. 2 is a partially exploded view of the pipe splitting assembly.

The pipe splitting assembly 100 is shown partially exploded in FIG. 2. A collet 200 is shown at an end 202 of the cable 106. In another example, the collet 200 is placed at a point along a length of cable 106, for instance between a winch at one end of a pipe to be split and a spool of cable at the other end of the pipe. The collet 200 is sized and shaped to grasp the cable 106. As further described below, the collet 200 securely grasps the cable when the collet engages against an interior surface of the expander 108. The collet 200 acts as a lug that transmits pulling forces from a winch, such as a capstan winch, to the expander 108 and the cutter 102. In one example, pulling forces are transmitted from the collet 200 to the expander 108, and the expander 108 transmits the pulling forces to the cutter 102. The cable 106 thereby forces the cutter 102 and expander 108 to split the pipe and push it outwardly away from the cable 106.

Referring again to FIG. 2, in one example, the puller shoulder 116 includes a fitting 204 sized and shaped to couple the puller shoulder 116 with the expander 108. The fitting 204 includes, but is not limited to, threading, detents, mechanical locks and the like to securely couple the expander 108 with the puller shoulder 116. For instance, as shown in FIG. 2, the fitting 204 includes threading and an interior surface of the expander 108 includes complementary threading to retain the coupling between the expander 108 and the puller shoulder 116. In another example, the fitting 204 engages against the collet 200 and urges the collet to grasp the cable 106 prior to tensioning the cable. The secure coupling facilitates transmission of pulling forces through the collet 200 to the expander 108 and from the expander 108 to the puller shoulder 116 and the replacement pipe 121. In another example, the pulling forces are transmitted from the puller shoulder 116 through the bridge 118 to the puller sleeve 122 and the pipe 121.

Figure 3:
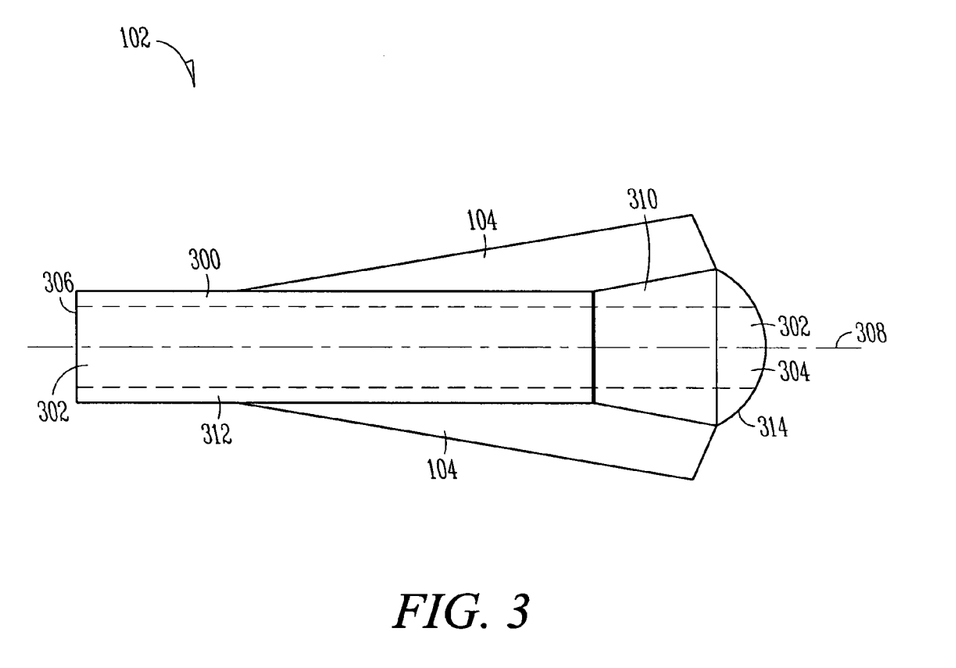
FIG. 3 is a side view of one example of the cutter.

The pipe splitter (e.g., cutter 102) is shown in FIG. 3. The cutter 102 includes a base 300 sized and shaped to couple around the cable 106, shown in FIG. 1. In one example, the cutter 102 includes a cutter lumen 302 sized and shaped to slidably receive the cable 106. The cutter lumen 302 extends from a proximal end 304 to a distal end 306 of the cutter 102. A longitudinal axis 308 of the cutter 102 extends through the cutter 102, as shown in FIG. 3. When the cutter 102 is slidably coupled with the cable 106, the longitudinal axis 308 is aligned with at least the portion of the cable 106 in the cutter lumen 302. In another example, the base 300 includes a frusto-conical portion 310 and a cylindrical portion 312 distal to the frusto-conical portion 310. As described above, the expander 108 (FIG. 1) includes a tapered profile. Optionally, the frusto-conical portion 310 of the cutter 102 provides a flush transition from the cutter 102 to the expander 108 when coupled together (See FIG. 1). The flush transition ensures that pipe split by the cutter 102 begins expanding because of engagement with the frusto-conical portion 310 and continues to expand when engaged with the expander 108. Additionally, the flush transition substantially prevents the split pipe from snagging at the flexible joint 114 (FIG. 1). In yet another example, the cutter 102 has a frusto-conical geometry that tapers from the proximal end 304 to the distal end 306. In still another example, the cutter 102 tapers from the proximal end 304 to the distal end 306 (e.g., a portion of the cutter 102 exterior is tapered and another portion is substantially flat).

In another example, the cutter 102 includes the blades 104 extending along the base 300 of the cutter. The blades 104 extend at an acute angle with respect to the longitudinal axis 308. Optionally, the blades 104 extend at an angle of between less than 90 degrees and more than 0 degrees with respect to the longitudinal axis. In yet another example, the blades 104 gradually taper from the distal end 306 toward the proximal end 304. The acute angle of the blades 104 engages the blades against the interior of a pipe to be split. As the cutter 102 moves down the pipe, the blades 104 apply greater pressure to the pipe interior and eventually split the pipe from the interior outwardly. Engaging the pipe along the interior facilitates cutting of the pipe without directly engaging a longitudinal end of the pipe. Even where the pipe is in loose soil or rock, the cutter 102 does not longitudinally move the pipe (e.g., toward the capstand winch) because the force that splits the pipe is substantially directed from the interior to the exterior of the pipe and not longitudinally. Moreover, less pulling force is required to cut the pipe with the blades 104 tapered than a cutting surface that directly engages the end of a pipe.

Optionally, the cutter 102 is constructed with a hardened material configured to cut through pipe (e.g., copper, lead, HDPE, PVC and the like). In one example, the cutter 102 is constructed with, but not limited to, hardened S7 tool steel and the like. In another example, the cutter 102 includes at least one of a variety of features configured to split a pipe. For instance, the cutter 102 includes, but is not limited to, serrations, a tapering profile, a single blade, a plurality of blades, a rotating cutting edge and the like. In one example, the tapering profile is repeatedly rammed into the pipe and the tapering profile splits open the pipe.

Referring again to FIG. 3, the cutter 102 includes a fitting 314. In one example, the fitting 314 is round and extends from the proximal end 304 of the cutter 102. The fitting 314 is received in a corresponding socket in the expander 108 (FIG. 1), as described below. The fitting 314, in another example, is a ball received in the socket to form a ball and socket joint at the flexible joint 114 between the cutter 102 and the expander 108, as shown in FIG. 1. The rounded fitting 314 allows the cutter 102 to rotate within the socket of the expander 108, for example, during navigation of piping elbows. The fitting 314 facilitates rotation of the cutter 102 relative to the expander 108. In another example, the fitting 314 forms part of a hinge, a universal joint and the like at the flexible joint 114. In yet another example, the fitting extends from the expander 108 and the cutter 102 includes the socket.

Figure 4A:
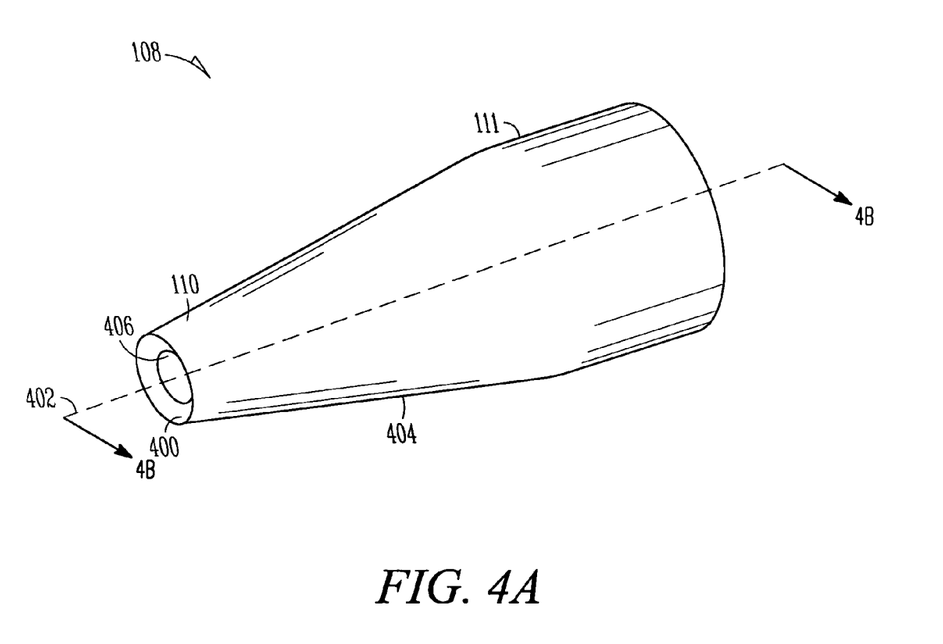
FIG. 4A is a perspective view of one example of the expander.

Referring now to FIG. 4A, the expander 108 including the socket 400 is shown. The socket 400 is sized and shaped to receive the fitting 314 of the cutter 102 (FIG. 3). The socket 400, in one example, includes a rounded surface that permits rotation of the cutter 102 with respect to the expander 108 at the flexible joint 114 (FIG. 1). The fitting 314 and the socket 400 form a ball and socket joint between the cutter 102 and the expander 108. In another example, the socket 400 forms part of a hinge, universal joint and the like at the flexible joint 114. The socket 400 cooperates with the fitting 314 to flexibly couple the cutter 102 with the expander 108 to traverse tight elbows and bends in piping. Optionally, the expander 108 includes the fitting 314 and the cutter includes the socket 400. Referring again to FIG. 3, in yet another example, the cutter 102 rotates out of alignment with a longitudinal axis 402 (FIG. 4A) of the expander 108 at the flexible joint 114 (FIG. 1) during navigation of elbows and bends in piping. Optionally, the longitudinal axis 308 of the cutter 102 (FIG. 3) rotates out of alignment with the longitudinal axis 402 of the expander 108 during navigation of elbows and bends.

Additionally, the socket 400 is configured to transmit forces (e.g., pulling forces from the cable) to the cutter 102 (FIG. 3). The socket 400 engages against the fitting 314 (FIG. 3) and moves the cutter 102 along the pipe and thereby splits the pipe. In still another example, where the flexible joint 114 includes a hinge, universal joint and the like, the joint mechanism transmits forces from the expander 108 to the cutter 102. Optionally, the expander 108 is constructed with a material capable of transmitting forces to the cutter 102 and the puller shoulder 116 (FIG. 2) and pry apart a split pipe (e.g., copper, lead, HDPE, PVC and the like). In one example, the expander 108 is constructed with, but not limited to, 1018 carbon steel and the like.

Moreover, the flexible coupling of the cutter 102 (FIG. 3) and the expander 108 (FIG. 4A) provides modularity to the pipe splitting assembly 100. In one example, the cutter 102 is paired with one of a selection of expanders 108 (e.g., with different size perimeters, profiles, materials and the like) including similarly configured sockets 400. Each expander 108 is thereby couplable with the cutter 102 to facilitate use of the cutter 102 with a variety of pipe diameters and materials. In another example, a new expander 108 is coupled with an existing serviceable cutter 102 without requiring a full replacement of the pipe splitting assembly 100 when an old expander 108 wears out. In still another example, the expander 108 is configured to couple with a variety of cutters 102 including fittings 314 configured to couple with the socket 400. The cutters 102 include, but are not limited to, configurations with one or more blades, serrations, rolling cutting surfaces, tapered profiles for splitting pipe, different materials and the like. In yet another example, the expander 108 is configured to couple with a replacement cutter 102 to preclude replacement of the entire pipe splitting assembly 100 when the cutter wears out or fails. Optionally, the pipe splitting assembly 100 includes a kit having a variety of the cutters 102 and expanders 108 for differing pipe diameters, materials and the like. The kit includes instructions detailing which cutters 102 and expanders 108 to use in combination for a desired pipe size and material.

As described above, the cutter 102 flushly transitions to the expander 108 with the frusto-conical portion 310, in one example. Optionally, the outer perimeter 404 of the expander 108 has a tapered profile and continues from the distal end 110 (adjacent to the cutter frusto-conical portion 310) along the expander 108 toward the proximal end 111. The tapered profile extends at an acute angle with respect to the longitudinal axis 402 of the expander, for instance, between less than 90 degrees and more than 0 degrees. Pipe split by the cutter 102 thereby moves over the cutter 102 and onto the expander 108 without snagging at the flexible joint 114 (FIG. 1). The tapered profile of the expander 108 bursts and pries the split pipe apart to make room for a replacement pipe and/or facilitate removal of the split pipe. In another option, at least a portion of the outer perimeter 404 of the expander 108 has a larger perimeter than the perimeter of the cutter 102. For instance, the expander 108 includes ridges, crests, knurling and the like sized and shaped to pry apart pipe split by the cutter 102. In yet another option, a portion of the expander outer perimeter 404 has a cross-sectional dimension (e.g., width, diameter and the like) larger than a cross-sectional dimension of the cutter 102.

Figure 4B:
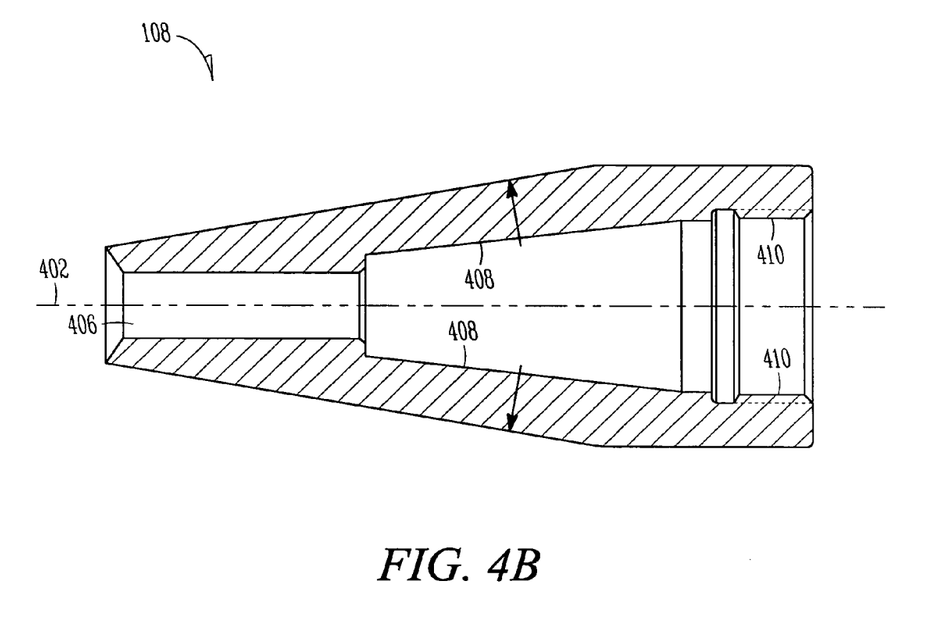
FIG. 4B is a cross sectional view of the expander taken along line 4B-4B in FIG. 4A.

As shown in FIGS. 4A, B, the expander 108 includes an expander lumen 406. The expander lumen 406 is sized and shaped to receive the cable 106, shown in FIG. 1. The expander 108 is slidably coupled along the cable 106 during operation of the pipe splitting assembly 100 (FIG. 1). The cable 106 extends through the cutter 102 and the expander 108 and ensures that both pieces are coincident with the cable 106 during a splitting operation. The flexibility of the cable 106 permits the cutter 102 (FIG. 3) to rotate with respect to the longitudinal axis 402 of the expander 108 while ensuring the expander 108 follows the cutter 102.

Referring now to FIG. 4B, the expander lumen 406 of the expander 108 is defined by an interior surface 408. At least a portion of the interior surface 408 includes a tapered surface sized and shaped to engage with the collet 200, as shown in FIG. 2. The interior surface 408 of the expander 108 engages against the collet 200 while the collet is pulled with the cable 106 (FIG. 2). The engagement of the interior surface 408 with the collet 200 forces the collet 200 to tightly grasp the cable 106, as further described below.

The interior surface 408 further defines a shoulder joint 410 sized and shaped to couple with the puller shoulder 116, shown in FIG. 2. The shoulder joint 410 transmits pulling forces to the puller shoulder 116, bridge 118, sleeve 122 and the replacement pipe 126 (FIG. 2). In one example, the shoulder joint 410 is sized and shaped to couple with the fitting 204 (FIG. 2) on the puller shoulder 116. The shoulder joint 410, in another example, includes, but is not limited to, threading, detents, mechanical locks and the like to securely the couple the puller shoulder 116 with the expander 108. For instance, referring now to FIG. 2, the fitting 204 includes threading and the shoulder joint 410 (FIG. 4) includes complementary threading to retain the coupling between the puller shoulder 116 and the expander 108.

Figure 5:
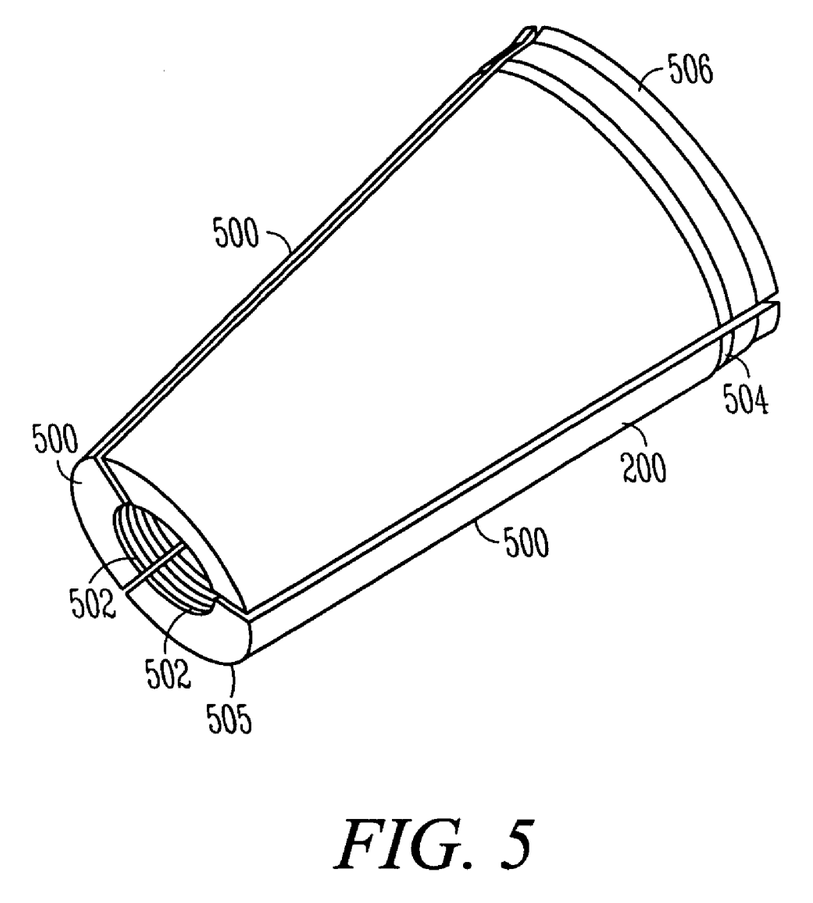
FIG. 5 is a perspective view of one example of the collet.

FIG. 5 is a perspective view showing the collet 200. In one example, the collet 200 includes two or more jaws 500 sized and shaped to extend around the cable 106 (FIGS. 1 and 2). Optionally, the jaws 500 include a roughened interior surface 502 (e.g., serrations, knurling, projections and the like) configured to grasp the cable 106 and substantially prevent movement of the collet 200 along the cable 106, as described below. In another option, the jaws 500 are substantially smooth and rely on friction between the jaws and the cable 106 to grasp the cable 106 and substantially prevent movement of the collet 200 relative to the cable 106. The jaws 500 have a tapered profile that gradually increases from the distal end 505 to the proximal end 506. The jaws 500 are retained around the cable 106 with a band 206 shown in FIG. 2. The band 206 is elastic, in another example, and provides sufficient force around the jaws 500 to hold them against the cable 106. The band 206 is held within a groove 504 substantially adjacent to the proximal end 506 of the collet 200, in still another example.

Referring again to FIG. 2, the collet 200 is positioned proximally relative to the expander 108 and the cutter 102.

When tension is applied to the cable 106 at one end of the pipe, (e.g., by a cable puller such as a capstan winch, another winch, by a vehicle and the like) the collet 200 is pulled into the expander 108. Referring now to FIGS. 4B and 5, the jaws 500 of the collet 200 engage against the tapered interior surface 408. The taper 408 presses against the jaws 500 and urges the jaws 500 into tight engagement with the cable 106 (FIG. 2). As the jaws 500 are urged against the cable 106, the roughened surface 502 of each jaw 500 tightly grasps the cable 106 and substantially prevents relative movement of the collet 200 along the cable 106. In another option, the jaws 500 are smooth and the friction between the jaws 500 and the cable 106 substantially prevents relative movement. The collet 200 thereby cooperates with the expander 108 to grasp the cable 106 and facilitate transmission of pulling forces to the pipe splitting assembly 100 (FIG. 1). Pulling forces in the cable 106 are transmitted through the collet 200 into the expander 108 and the cutter 102. In one example, where the puller shoulder 116 is coupled with the expander 108, pulling forces in the cable 106 are transmitted to the puller shoulder 116. In another example, the tapered portion of the interior surface 408 has a complementary taper to the jaws 500 of the collet 200. In yet another example, the interior surface 408 has a differing taper than that of the jaws 500.

Figure 6:
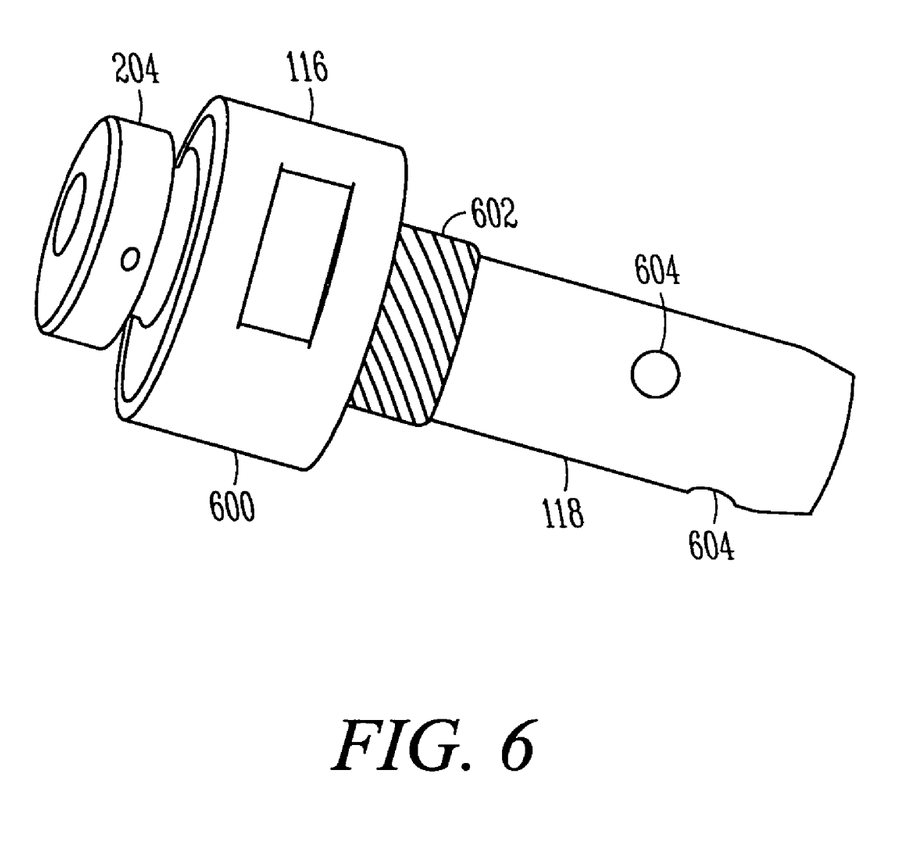
FIG. 6 is a perspective view of one example of the puller shoulder and the bridge.

FIG. 6 shows the puller shoulder 116 including the fitting 204, puller base 600 and the bridge 118. As described above, the fitting 204 is sized and shaped to couple with the shoulder joint 410 and thereby couple the puller shoulder 116 with the expander 108 (FIGS. 4A, B). In another example, the puller base 600 has a profile substantially similar to the profile of the expander 108 (FIGS. 1 and 2). The similar profile of the puller base 600 allows the puller shoulder 116 to move with the cutter 102 and expander 108 without performing any expanding function. The puller shoulder 116 pulls the replacement pipe 121 with the cutter 102 and the expander 108, as shown in FIGS. 1 and 2. In yet another example, the pipe splitting assembly 100 does not include the puller shoulder 116, and instead pulls the cable 106 through the split pipe. A replacement pipe is then pulled through on the cable 106 after the pipe splitting operation is completed. In still another example, the split pipe is removed and the remaining cable pulls the replacement pipe into place afterward, as further described below.

The bridge 118 of the puller shoulder 116 connects the puller shoulder 116 with the replacement pipe 121 and the puller sleeve 122, shown in FIGS. 1 and 2. As described above, in one example, the bridge 118 includes threading 120 (FIG. 1). The threading 120 is configured to couple with the sleeve 122 and the replacement pipe 121. In one example, the threading 120 is a tapping surface and cuts corresponding threading into the replacement pipe 121, such as a plastic pipe (e.g., HDPE and the like). The threading cut into the replacement pipe 121 assists in grasping the replacement pipe 121 when it is pulled into place by the cable 106. In another example, the threading in the replacement pipe 121 facilitates coupling of the replacement pipe 121 with other pipes 121 and pipe fittings, such as elbows.

Referring again to FIG. 6, in another example, the puller shoulder 116 includes a coupling ring 602 sized and shaped to couple with the puller sleeve 122, for instance, the puller sleeve shown in FIG. 7, described below. The coupling ring 602, in yet another example, includes threading configured to mate with corresponding threading on the sleeve 122 and thereby securely couple the puller sleeve 122 with the puller shoulder 116. Optionally, the coupling ring 602 has features for coupling with the puller sleeve 122 including, but not limited to, mechanical fasteners, locks, welds, bolts and the like. In still another example, the puller sleeve 122 is integral to the puller shoulder 116. The bridge 118 extending from the puller shoulder 116 includes apertures 604. The apertures 604 cooperate with the puller sleeve 122 to retain the replacement pipe 121 along the puller shoulder 116 during a pulling operation, as described below. In yet another example, the bridge 118 includes features sized and shaped to grasp the replacement pipe 121 for pulling by the pipe splitting assembly 100. For instance, the bridge 118 includes clamps, bolts, mechanical locks, deformable surfaces and the like configured to grasp the replacement pipe 121 and pull the pipe during a pipe splitting operation.

Figure 7:
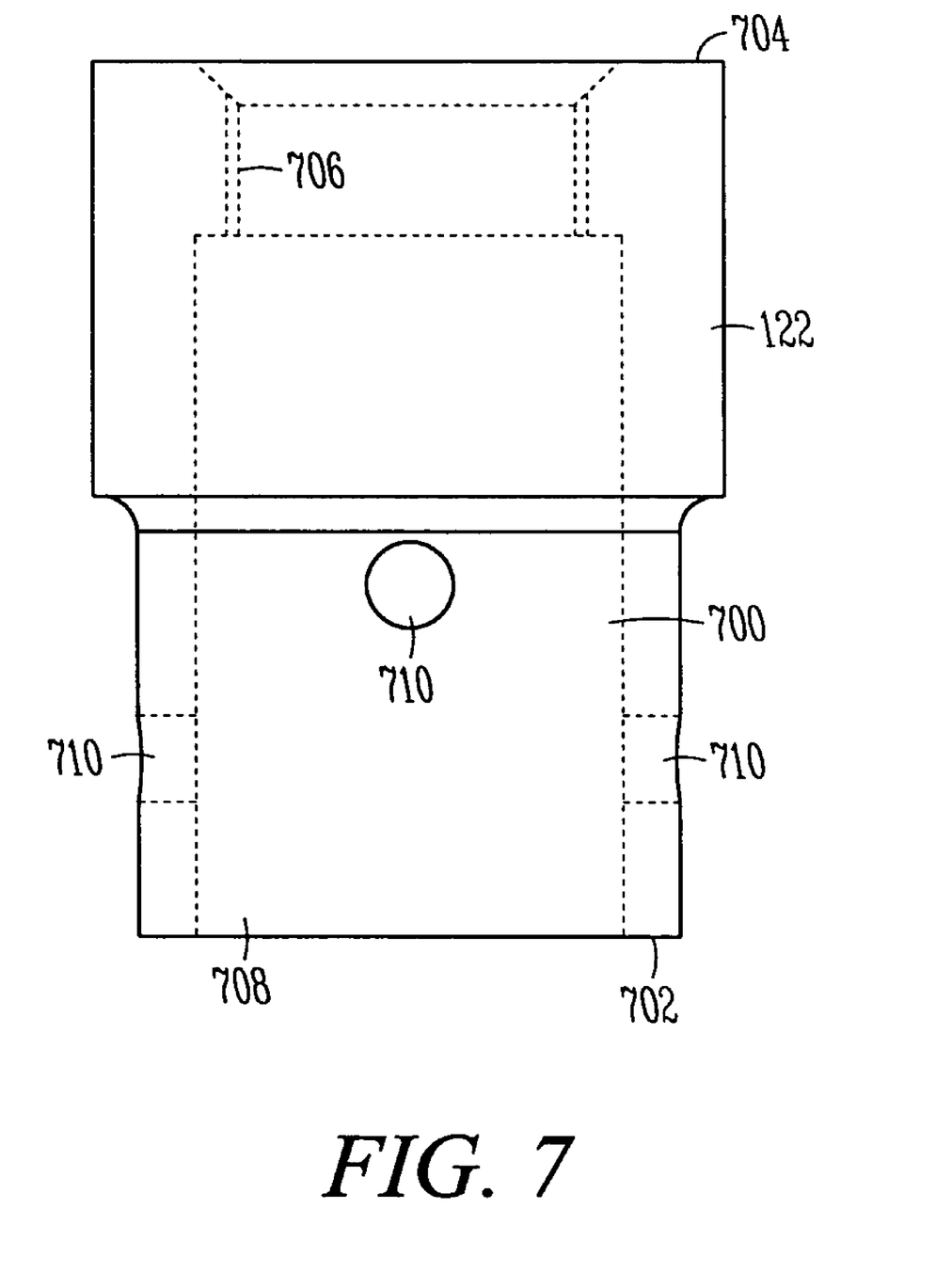
FIG. 7 is a side view of one example of the puller sleeve.

The puller sleeve 122 is shown in FIG. 7. The puller sleeve 122 includes a sleeve lumen 700 extending from a proximal end 702 to a distal end 704. In one example, a first portion 706 of the sleeve lumen 700 is sized and shaped to couple with the coupling ring 602 of the puller shoulder 116 (FIG. 6). The first portion 706, in another example, includes threading corresponding with threading in the coupling ring 602. The puller sleeve 122 couples with the puller shoulder 116 by engaging the complementary threading. In yet another example, the threading of the puller sleeve 122 is coupled with threading 120 along the bridge 118, as shown in FIGS. 1 and 2. The sleeve 122 is screwed onto the threading 120 and the threading 120 is also used to tap and grasp the replacement pipe 121. Optionally, the puller sleeve 122 and the puller shoulder 116 are coupled with at least one of a variety of features, such as mechanical fasteners, locks, welds, bolts and the like. In another option, the puller sleeve 122 and puller shoulder 116 are integral.

The second portion 708 of the puller sleeve lumen 700, in one example, has a slightly larger diameter than the first portion 706. The replacement pipe 121 is received within the second portion 708, and the bridge 118 extends inside the replacement pipe 121, in another example. The replacement pipe 121 is thereby held between the puller sleeve 122 and bridge 118. In the example of the bridge 118 shown in FIGS. 1 and 2, the puller sleeve 122 cooperates with the threading 120 on the bridge 118 to grasp the replacement pipe 121 and prevent the pipe 121 from slipping over the threading 120. In the example of the bridge 118 shown in FIG. 6, the replacement pipe 121 is inserted between the puller sleeve 122 and the bridge 118 and the apertures of the bridge 118 and apertures 710 of the puller sleeve 122 are aligned. Optionally, the replacement pipe 121 includes pre-formed holes. Pins (e.g., bolts, screws, fasteners and the like) are inserted through the puller sleeve 122, the replacement pipe 121 and the preformed holes of the bridge 118 to couple the replacement pipe 121 with the puller shoulder 116. In another option, holes are formed in the replacement pipe 121 by driving the pins therethrough or drilling out holes.

Figure 8:
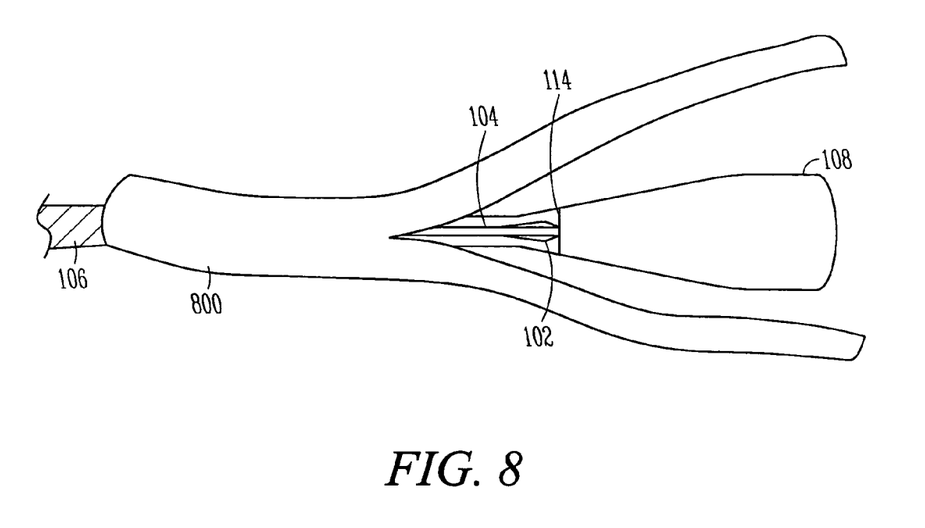
FIG. 8 is a side view of another example of the pipe splitting assembly with a partially split pipe.

Referring now to FIG. 8, in operation, the cable 106 is fed through a pipe (e.g., pipe 800) that needs replacement and/or removal. The pipe splitting assembly 100, including at least the expander 108 and the cutter 102 is coupled with the cable 106. In one example, the cutter 102 is threaded over the cable 106, and the expander 108 is threaded behind the cutter 102. In another example, the collet 200 (FIG. 2) is coupled with the cable 106 behind the expander 108. Tension is applied to the cable 106, and the cable 106 and the collet 200 coupled therearound are drawn through at least a portion of the expander. Referring to FIG. 4B, the collet 200 is drawn into the expander lumen 406 and engages the interior surface 408. The tapered portion of the interior surface 408 presses against the jaws 500 of the collet 200 (FIG. 5) and forces the jaws to tightly engage against the cable 106. The roughened interior surfaces 502 of the jaws 500 grasp the cable 106 and substantially prevent movement of the collet 200 with respect to the cable 106. The collet 200 thereby allows transmission of pulling forces from the cable 106 to the expander 108. As shown in FIG. 8, the expander 108 is flexibly coupled with the cutter 102 at the flexible joint 114. As described above, in one example, the flexible joint 114 is formed with the fitting 314 and the socket 400 to permit rotation of the cutter 102 with respect to the longitudinal axis 402 of the expander 108 (FIG. 4A). The pulling forces are transmitted to the cutter 102 from the expander 108 through the flexible joint 114.

The pulling forces transmitted from the cable 106 to the cutter 102 force the cutter 102 into engagement with the interior surfaces of the pipe 800, and the blades 104 press outwardly against the pipe interior surfaces to split the pipe 800. In another example, the blades 104 have an acute angle with respect to the longitudinal axis 308 of the cutter 102. The blades 104 cut the pipe from the pipe interior toward the exterior and thereby do not directly engage the end of the pipe 800 at an orthogonal angle. The tapered blades 104 substantially reduce the chance that the forces from the cutter 102 will move the pipe 800 in loose soil and the like instead of cutting the pipe 800. Additionally, the tapered blades 104 require less pulling force to split the pipe than a blade directly engaged with the end of a pipe. In yet another example, the cutter 102 includes at least one of a single blade, plurality of blades, tapered splitting surface, serrations and the like. The cutter 102, optionally splits the pipe 800 by repeated ramming engagement of a tapered splitting surface with the pipe 800.

As shown in FIGS. 3 and 8, the cutter 102 includes at least two blades 104. The blades 104 are shown on substantially opposite sides of the cutter 102 (e.g., about 180 degrees apart). In another example, the blades 104 are spaced a different interval, for instance between about 45 and 180 degrees apart. The two or more blades 104 split the pipe 800 at least twice thereby separating the pipe 800 into two or more pieces. In one example, the cable 106 extends fully through the pipe 800 and extends from a spool at a first end of the pipe 800 to a winch (e.g., a capstan winch) at the opposed end of the pipe 800. The pipe splitting assembly 100 without the puller shoulder 116, puller sleeve 122 and a replacement pipe 121 are pulled through the pipe 800 to split the pipe 800 into two or more pieces. The cable 106 remains therein and runs between both ends of the split pipe 800. The split pipe 800 is then pulled (e.g., by attaching to a piece of heavy machinery such as a backhoe) to remove the split pipe 800 from the ground. Optionally, the pipe 800 is lead or HDPE and it is desirable to remove such pipe out of the ground, for instance because of environmental concerns. After removal, the cable 106 remains and the replacement pipe 121 is then pulled through on the cable 106 with an assembly similar in many respects to the puller shoulder 116, bridge 118 and the puller sleeve 122.

As described above, the pipe splitting assembly 100 includes a flexible joint 114. The flexible joint 114 permits the cutter 114 to rotate relative to the expander 108 (e.g., with respect to the longitudinal axis 402) when the cutter 114 navigates elbows and bends in the pipe 800 (e.g., a small diameter pipe). The flexibility of the cable 106 permits the expander 108 to follow the cutter 114 around corners while still operating to burst the split pipe 800 outwardly and thereby make room for the replacement pipe 121. Stresses between the cutter 102 and the expander 108 are thereby reduced in corners and elbows, and failure of the pipe splitting assembly 100 is substantially precluded. Frequent replacement of the cutter 102 and the expander 108 is thereby avoided.

Figure 9:
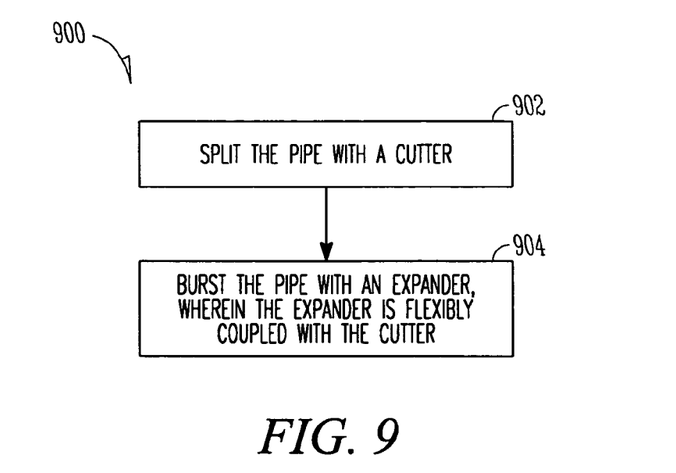
FIG. 9 is a block diagram showing one example of a method for splitting an in-ground pipe.

FIG. 9 shows one example of a method 900 for splitting an in-ground pipe, such as pipe 800, shown in FIG. 8. One example, of a pipe splitting assembly used in the method 900 is shown in FIGS. 1-8 as pipe splitting assembly 100, and is referenced below. At 902 the pipe is split with a cutter 102. At 904, the pipe is burst with an expander 108, and the expander 108 is flexibly coupled with the cutter 102. In one example, the method 900 further includes pulling the cutter 102 and the expander 108 through the pipe with a flexible element, such as a cable 106, coupled with the cutter and the expander. In another example, splitting the pipe with the at least one blade includes splitting the pipe with the at least one blade 104 extending at an acute angle with respect to a longitudinal axis 308 of the cutter 102. The method 900 includes, in yet another example, splitting the pipe from an interior of the pipe toward an exterior of the pipe.

Several options for the method 900 follow. In one option, splitting the pipe includes splitting the pipe into separate pieces with the at least one blade and a second blade, for instance blades 104. In another option, the method 900 includes pulling the separate pieces out of the ground. The flexible element (e.g., cable 106) is left in the ground in place of the pipe, in yet another option. In another option, the method 900 includes pulling a second pipe 121 behind the expander 108. In still another option, the method 900 further includes rotating the cutter 102 out of alignment with a longitudinal axis 402 of the expander 108.

Figure 10:
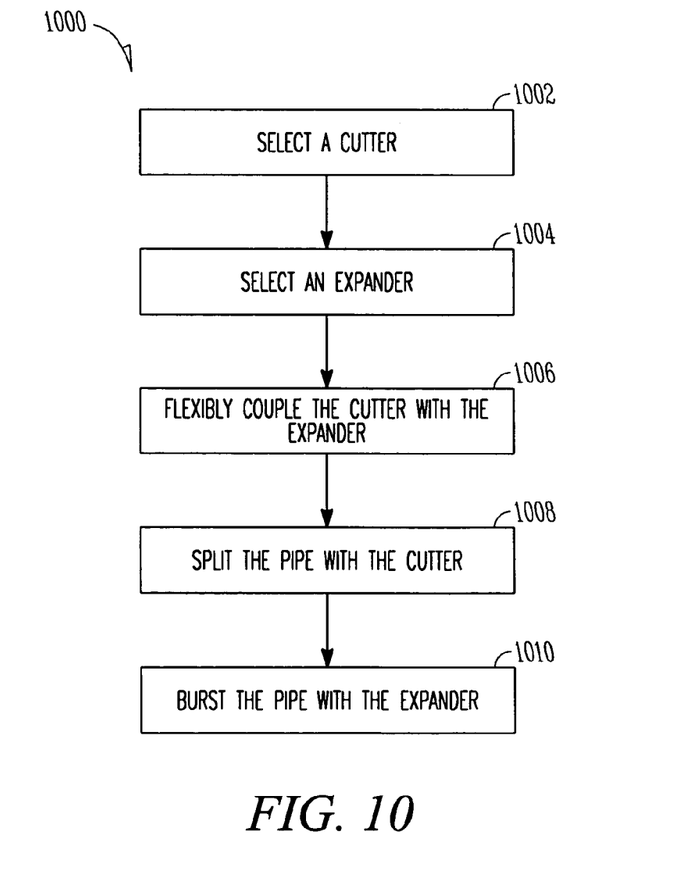
FIG. 10 is a block diagram showing one example of a method for splitting a pipe.

FIG. 10 shows another example of a method 1000 for splitting a pipe. One example, of a pipe splitting assembly used in the method 1000 is shown in FIGS. 1-8 as pipe splitting assembly 100, and is referenced below. At 1002, a cutter 102 is selected. For instance, a cutter 102 is selected for a particular pipe size, pipe material, number of desired cutting surfaces (e.g., blades 104), material of the cutter 102 and the like. At 1004, an expander 108 is selected. In one example, the expander 108 is selected based on, but not limited to, the material and/or configuration of the cutter 102, the material of the pipe, the size of the pipe and the like. At 1006, the cutter 102 is flexibly coupled with the expander. In another example, the cutter 102 is coupled with the expander 108 at the flexible joint 114. In yet another example, the cutter 102 is rotated out of alignment with a longitudinal axis 402 of the expander 108, for instance, to navigate corners and elbows. At 1008, the pipe (e.g., pipe 800) is split with the cutter 102. At 1010, the pipe is burst with the expander 108.

Several options for the method 1000 follow. In one option, the method 1000 further includes uncoupling the cutter from the expander, and flexibly coupling a second expander with the cutter. In another option, splitting the pipe with the cutter 102 includes splitting the pipe into separate pieces with a first blade 104 and a second blade 104. The method 1000 includes, in yet another option, pulling a second pipe 121 behind the expander 108. Splitting the pipe (e.g., pipe 800) with the cutter 102 includes splitting the pipe with at least one blade 104 extending at an acute angle with respect to a longitudinal axis 308 of the cutter. Optionally, the method 100 includes splitting the pipe from an interior of the pipe toward an exterior of the pipe.

CONCLUSION

The above described examples of pipe splitting assemblies and methods provide devices and methods usable to split a wide variety of pipe diameters including small piping with tight bends. The flexible coupling between the cutter and the expander allows the cutter to turn corners while the expander follows immediately behind the cutter. The flexible joint decreases stress in the cutter and the expander by allowing the cutter to navigate turns and elbows without having the expander rigidly coupled to the cutter. The flexible coupling thereby substantially prevents fracturing of the cutter or the expander when traversing elbows and bends, and consequently decreases cost and labor to replace either the cutter or expander.

Additionally, the flexible coupling makes the pipe splitting assembly modular and permits easy replacement of either one of the cutter and the expander without requiring replacement of the other component. Moreover, in another option, a variety of cutters with different geometries and cutting surfaces (e.g., tapered, multiple blades, blades at different angles, serrations, differing materials and the like) are matched with a desired expander. Further, a variety of expanders (e.g., of different sizes, different materials, geometries and the like) are matched with a desired cutter. Optionally, a selection of cutters and expanders are provided in a kit for use in a variety of pipe splitting applications, for instance, with different pipe sizes, materials and the like.

Moreover, the configuration of the cutter splits a pipe from the interior of the pipe toward the exterior. In one example, the cutter includes blades extending at an acute angle with respect to the longitudinal axis of the cutter. The blades taper and engage the interior of the pipe and do not directly engage the end of the pipe. The cutter thereby engages against the interior of the pipe first and presses outwardly while the cutter is pulled through the pipe. The blades, in another example, apply increasing pressure to the interior of the pipe and cut outwardly with movement of the cutter through the pipe. Because the cutter engages the interior of the pipe and does not directly engage an end of the pipe, the pipe remains stationary in the ground during the pipe splitting operation. Additionally, the tapered blades require less pulling force to split the pipe than a blade directly engaged with the end of a pipe.

In another example, the pipe splitting assembly pulls a replacement pipe immediately behind the cutter and expander in a single operation. An old pipe is split and burst and a new pipe is immediately pulled into place. In yet another example, the pipe splitting assembly is pulled without also pulling a replacement pipe. For instance, the cutter includes two or more blades that split the existing pipe into two or more pieces. The cutter is pulled through on a cable, and the cable remains in the location of the burst pipe. The pieces of the existing pipe are then pulled (e.g., with a backhoe, truck and the like) out of the ground, and the cable is left behind. A replacement pipe is then pulled through on the cable to replace the previously removed pipe. Removal of the existing pipe is optionally performed depending on the material of the pipe. For example, pipe materials including, but not limited to, lead, HDPE and the like are removed prior to positioning a replacement pipe.

Although selected advantages are described above, the list is not intended to be exhaustive. Further, the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present application. The scope of the invention should, therefore, be determined with reference to the appended claims, along with the full scope of equivalents to which such claims are entitled.

What is claimed is:

1. A pipe splitting assembly comprising:
 a pipe splitter; and
 an expander having an outer perimeter larger than an outer perimeter of the pipe splitter;
 a ball and socket joint between the pipe splitter and the expander; and
 a coupling to attach a cable to the pipe splitting assembly, wherein a pulling force is transmitted through the ball and socket joint in compression.

2. The pipe splitting assembly of claim 1, wherein the pipe splitter and expander are longitudinally arranged along a flexible element.

3. The pipe splitting assembly of claim 1, wherein at least one of the expander and the pipe splitter includes a socket sized and shaped to receive a fitting on the other of the expander and the pipe splitter, and the fitting is adapted to rotate within the socket.

4. The pipe splitting assembly of claim 3, wherein the fitting is at a proximal end of the pipe splitter.

5. The pipe splitting assembly of claim 1, wherein the pipe splitter includes a pipe splitter lumen and the expander includes an expander lumen, and the pipe splitter lumen and the expander lumen are sized and shaped to receive a flexible element therein.

6. The pipe splitting assembly of claim 5, wherein a collet extends at least part way around the flexible element, and the collet is sized and shaped to engage against an interior surface of the expander.

7. The pipe splitting assembly of claim 6, wherein the collet includes at least one jaw sized and shaped to engage against the flexible element and the interior surface of the expander.

8. The pipe splitting assembly of claim 7, wherein a retainer extends at least part way around the collet, and the retainer is sized and shaped to engage the at least one jaw with the flexible element.

9. The pipe splitting assembly of claim 1, further comprising:
 a puller shoulder sized and shaped to couple with the expander;
 a puller sleeve sized and shaped to receive a pipe therein; and
 a bridge coupled between the puller shoulder and the puller sleeve.

10. The pipe splitting assembly of claim 9, wherein the puller shoulder includes a threaded fitting and an interior surface of the expander includes a corresponding threaded portion sized and shaped to receive the threaded fitting.

11. The pipe splitting assembly of claim 9, wherein the bridge includes a tapping surface.

12. The pipe splitting assembly of claim 11, wherein the bridge and the puller sleeve are sized and shaped to clamp a pipe between the tapping surface and an interior surface of the puller sleeve.

13. The pipe splitting assembly of claim 1, wherein the pipe splitter includes a first blade and a second blade substantially opposed around the pipe splitter.

14. The pipe splitting assembly of claim 1, wherein the pipe splitter includes a cylindrical base portion and a frusto-conical base portion proximal to the cylindrical base portion, and an exterior surface of the frusto-conical base portion is flush with an exterior surface of the expander.

15. The pipe splitting assembly of claim 1, wherein the expander is hingedly coupled with an end of the pipe splitter.

16. A pipe splitter comprising:
a cutter including at least one blade at an acute angle with respect to a longitudinal axis of the pipe splitter; and
wherein an end of the cutter is adapted to flexibly couple with at least one expander, the flexible coupling including a load bearing surface having at least a load bearing surface portion that is perpendicular to an expander longitudinal axis when coupled thereto, the load bearing surface portion being perpendicular to the expander longitudinal axis in substantially any orientation of the cutter relative to the expander, the load bearing surface sized and shaped to receive pushing forces transmitted from the expander to the cutter.

17. The pipe splitter of claim 16, wherein the cutter includes a base, and at least a proximal portion of the base has a frusto-conical geometry.

18. The pipe splitter of claim 16, wherein the cutter includes a rotatable fitting at the end of the cutter.

19. A pipe expander comprising:
an expander having a taper between a first end and a second end; and
wherein at least one of the first end and the second end are adapted to flexibly couple with at least one cutter, the flexible coupling including a load bearing surface having at least a load bearing surface portion that is perpendicular to a cutter longitudinal axis when coupled thereto, the load bearing surface portion being perpendicular to the cutter longitudinal axis in substantially any orientation of the expander relative to the cutter.

20. The pipe expander of claim 19, wherein at least a distal portion of the expander has a frusto-conical geometry.

21. The pipe expander of claim 19, wherein the pipe expander includes a socket at the first end or the second end.

22. A pipe splitting apparatus comprising:
a cutter including at least one blade;
an expander coupled to an end of the cutter with a universal joint, and the expander has an outer perimeter larger than an outer perimeter of the cutter, the expander including an expander load bearing surface, the expander load bearing surface in surface-to-surface contact with a cutter load bearing surface throughout movement of the cutter relative to the expander, at least a portion of the expander load bearing surface being substantially perpendicular to a cutter longitudinal axis in substantially any orientation of the cutter with respect to the expander, the expander configured to transmit compressive pushing forces to the cutter;
a flexible element extending through the cutter and the expander; and
a collet sized and shaped to grasp the flexible element, wherein the collet is adapted to engage with an interior surface of the expander.

23. The pipe splitting apparatus of claim 22, wherein at least a proximal portion of the cutter has a frusto-conical geometry.

24. The pipe splitting apparatus of claim 23, wherein at least a distal portion of the expander has a frusto-conical geometry, and the proximal portion of the cutter and the distal portion of the expander are substantially flush.

25. The pipe splitting apparatus of claim 22, wherein the universal joint includes a ball and socket joint.

26. The pipe splitting apparatus of claim 25, wherein the cutter includes a ball fitting and the expander includes a socket sized and shaped to receive the ball fitting.

27. A method for splitting a pipe comprising:
selecting a cutter;
selecting an expander;
flexibly coupling the cutter with the expander, the expander including an expander load bearing surface, the expander load bearing surface in surface-to-surface contact with a cutter load bearing surface throughout movement of the cutter relative to the expander;
splitting the pipe with the cutter, the cutter pushed into the pipe by engagement between at least a portion of the expander load bearing surface and the cutter load bearing surface, the portion of the expander load bearing surface being substantially perpendicular to a cutter longitudinal axis in substantially any orientation of the cutter with respect to the expander; and
bursting the pipe with the expander.

28. The method for splitting the pipe of claim 27, further comprising:
uncoupling the cutter from the expander; and
flexibly coupling a second expander with the cutter.

29. The method for splitting the pipe of claim 27, wherein splitting the pipe with the cutter includes splitting the pipe into separate pieces with a first blade and a second blade extending from the cutter.

30. The method for splitting the pipe of claim 29, further comprising pulling the separate pieces out of the ground.

31. The method for splitting the in-ground pipe of claim 30, wherein pulling the separate pieces out of the ground includes leaving a flexible element extending through the ground in place of the separate pieces.

32. The method for splitting the pipe of claim 27, further comprising pulling a second pipe behind the expander.

33. The method for splitting the pipe of claim 27, wherein splitting the pipe with the cutter includes splitting the pipe from an interior of the pipe toward an exterior of the pipe.

34. The method for splitting the in-ground pipe of claim 27, further comprising pulling the cutter and the expander through the pipe with a flexible element coupled with the cutter and the expander.

* * * * *